Dec. 7, 1937. A. LEIB 2,101,436
DIRECTIVE SIGNALING
Filed July 26, 1934 2 Sheets-Sheet 1

INVENTOR
AUGUST LEIB
BY
ATTORNEY

Patented Dec. 7, 1937

2,101,436

UNITED STATES PATENT OFFICE 2,101,436

DIRECTIVE SIGNALING

August Leib, Berlin, Germany, assignor to Telefunken Gesellschaft für Drahtlose Telegraphie m. b. H., Berlin, Germany, a corporation of Germany Application July 26, 1934, Serial No. 737,010
In Germany July 26, 1933

4 Claims. (Cl. 250—11)

This invention relates to a method of transmission for directing the blind landing of aircraft.

It is known that, as an aid to the making of a blind landing of an airplane, a concentrated radiation may be provided having a smoothly ascending curved envelope the tapered apex of which lies at the transmitter. A zone of constant field intensity is thus obtained within which the landing must be performed. For the control of the lateral deviations from the landing curve two concentrated radiations may be transmitted from one and the same place and/or from a place near by. These radiations may be caused to have divergent axes and to have the same high frequency, though modulated by different audio frequencies. The two modulating frequencies are separated from each other at the output of the detector on the airplane, by means of resonant circuits, and are compared with each other in respect to the intensity of the energy by optical or acoustical means. The equality of the two intensities indicates that the airplane is in the prescribed vertical plane. This differential method has the disadvantage that the control of the lateral deviation from the prescribed vertical plane is accurate only when the modulations of the two symmetrical transmitter radiations are absolutely constant. Furthermore, the tunings of the filter circuits at the output of the airplane detector must be accurately adapted to these modulations and must be maintained in this condition continuously. This, however, is difficult of accomplishment over a long period of time. By a change of the natural resonance of the mentioned filter circuits serious errors appear in the indication, so that the differential method, bound up as it is with the requirement of absolute constancy of the resonant tunings, is not all that could be desired.

The method in accordance with the invention therefore avoids the application of the differential method and enables one to utilize simpler arrangements at the transmitter and at the receiver for directing a blind landing of airplanes.

In accordance with the invention, at the place of transmission, instead of three, only two radiations are transmitted, both on the same carrier wave of high frequency and preferably on an ultra short wave, but modulated by different audio frequencies. The one of the radiations is sharply concentrated and its axis is directed upwards at a suitable angle such that the locus of equal field intensity may be represented by a line slightly ascending from the place of transmission, which line can serve as a landing curve. The second radiation is concentrated within a vertical angle, but changes less with the height than the first radiation and furnishes approximately at a lateral limitation of the concentration (the region of the largest energy gradients) a field serving for the control of the lateral deviation from the curve of landing. In order to accomplish this, the vertical symmetry planes of the two radiations must form such an angle with each other, that the limiting surface furnished by the second radiation and serving for the lateral control (location of the definite, constant field intensity of this radiation) passes through the curve of landing.

Figure 1 shows vertical sections of two radiation beams 1, and 2, the lower side of radiation 1 being coincident with the curve of landing a—b.

Figure 4:
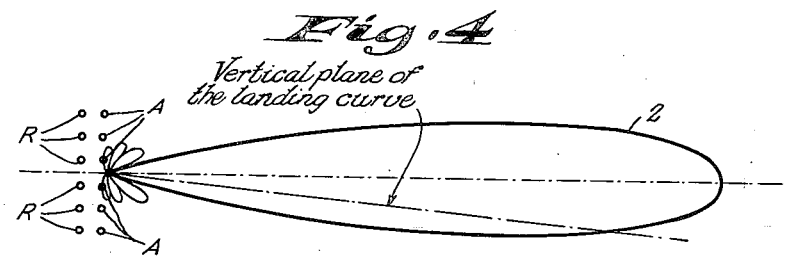
Figure 4 shows a plan view of the envelope of the beam 2.
Figure 5:
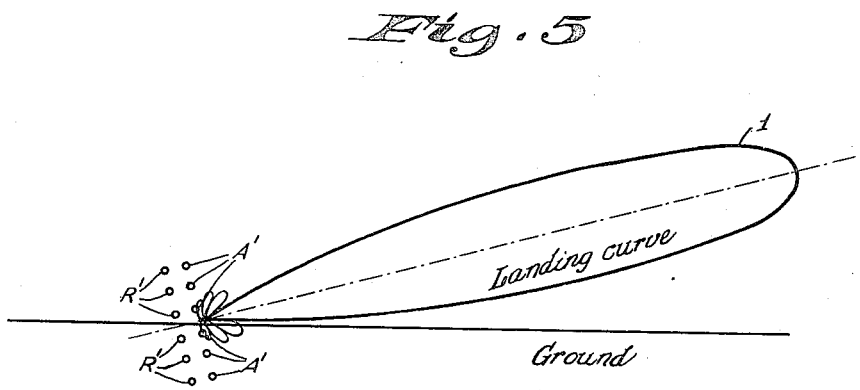
Figure 5 shows a vertical elevation of the envelope of beam 1.

Referring to the elevational view shown in Figure 5, the radiation 1 can be produced by a series of horizontal antennas A' each having the length $\lambda/2$ which are disposed close to the ground on a line extending at a right angle to the axis of radiation, and spaced approximately at a distance of $\lambda/2$ apart. These antennas are excited in equal phase and are suitably combined with a similar series of reflector antennas R' arranged in back thereof and spaced apart at a distance of approximately $\lambda/4$—$\lambda/5$. The second radiation 2 can be produced as shown in the plan view of Figure 4 by a series of vertical antennas A whose length is equal to $\lambda$ and which are disposed at a height above ground equal to or greater than $\lambda$ in one row along a line at a right angle to the main direction of the second radiation. In like manner this row of antennas can be combined with a similar row of reflector antennas R disposed in back of the former. It is also possible to use other antenna arrangements in particular, using suitable reflectors whereby the polarization of the two radiations may be vertical or horizontal.

Figure 1:
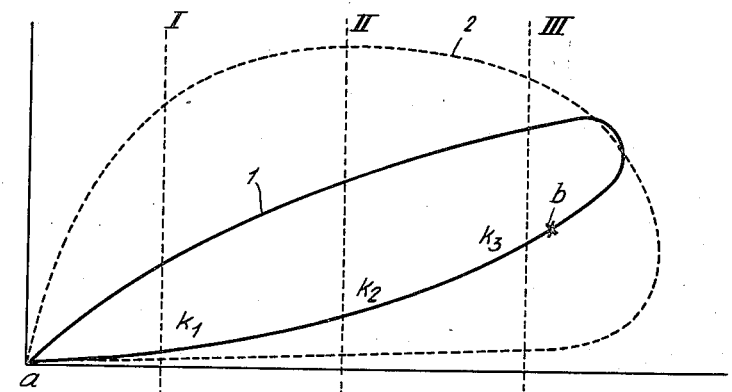
Figure 2:
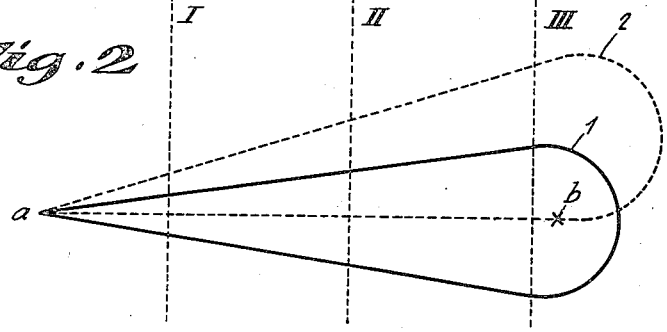
Figure 2 shows a plan view of the two concentrated radiations; their envelopes being the locations of definite constant field intensities. For the limiting surface 2 the location of the points of equal field intensity can be taken where the radiation gradient is approximately the highest.
Figure 3:
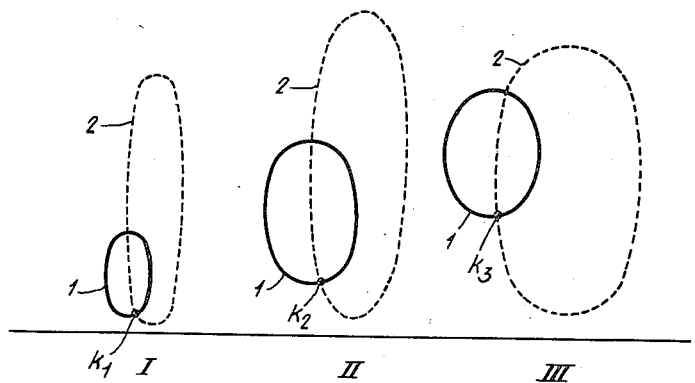
Figure 3 represents cross sections of the beams of Figures 1 and 2, taken along the lines I, II and III, respectively.

Figure 3 shows the vertical sections of the two radiations through vertical planes I, II or III respectively of Figures 1 and 2. The limiting curves 1 and 2 determine by their intersections in these three planes the points k1, k2, k3 respectively which lie in the curve of landing.

Figure 6:
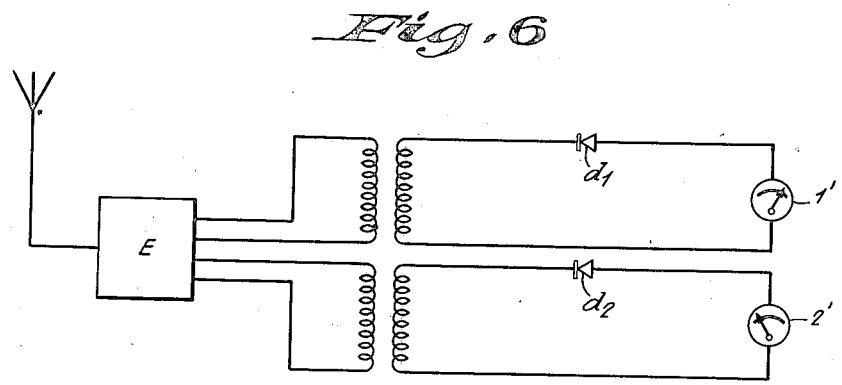
Figure 6 illustrates the essential features of a receiver for receiving signals transmitted in accordance with my novel method.

Figure 6 shows in a purely schematic manner the receiver arrangement on the airplane. The two radiations are received by the common receiver E which separates at its output side the two modulating frequencies. The two output energies thus separated are supplied to two measuring instruments 1', 2' and this across suitable rectifiers d1, d2 in case of direct current instruments or without rectification if alternating current instruments are to be used. The instrument 1' is suitably so adjusted that the horizontal position of its pointer corresponds with the selected receiving intensity of the radiation 1 of the curve of landing. The deviation of the pointer in an upward direction or downwards indicates that the airplane is above or below the required curve of landing. In similar manner the measuring instrument 2' is so adjusted and oriented that the vertical position of its pointer corresponds with the chosen receiving intensity of the radiation 2 in the limiting zone thereof. The deviation of the pointer towards the right or left from this position indicates that the airplane is at the right or left side from the directing surface. By the use of very short waves (meter or decimeter waves) and correspondingly small directional antenna systems the latter can be tunably arranged, so as to provide the possibility of adjusting the line of landing as may be desired in accordance with the incident direction of the wind.

Having thus described my invention and the operation thereof, what I claim is:

1. The method of transmission of radiant energy for directing the blind landing of aircraft, which includes the steps of, transmitting from the region of a given location two radiations of the same carrier frequency and modulated by different modulating frequencies, sharply concentrating one radiation and directing the same substantially upwards at such an angle that the underlying envelope thereof which traverses the locus of equal field intensity defines a curve of landing, directionally concentrating the second radiation within a vertical angle which varies less in height than the first radiation, and which is so oriented with respect to the first radiation in the region of the highest energy gradients that it serves for the control of the lateral deviation from the curve of landing, and causing the vertical symmetry planes of the two radiations to form such an angle with each other that the surface serving for the lateral control and furnished by the second radiation passes through the curve of landing.

2. The method of directing a plane to a blind landing on a field which includes the steps of generating ultra high frequency carrier wave energy, modulating two portions of said energy with different modulating frequencies, directing one portion of said energy in a concentrated beam the lower boundary of which is caused to follow a curved path which approaches the earth at a diminishing rate and is tangent thereto at the point at which it is desired to land, directing the other portion of said energy in a less concentrated beam, and causing one boundary of said beam to lie substantially along the axis of said first named beam.

3. In a device for directing an airplane to a blind landing, means for producing two directional beams of modulated wave energy, one of said beams having a lateral wall of its envelope of uniform field intensity which approximately bisects the uniform field intensity envelope of the second of said beams, and beam focussing means such that the lower line of intersection of the two said envelopes follows a curved path approaching the earth at a diminishing rate and is substantially tangent thereto at the point at which it is desired to land.

4. A device according to claim 3 and comprising means for modulating the two said beams distinguishably one from the other.

AUGUST LEIB.